United States Patent [19]

Watanabe

[11] 3,712,629

[45] Jan. 23, 1973

[54] TOY PHONOGRAPH

[76] Inventor: Katsumi Watanabe, No. 371, Ozenji, Kawasaki, Japan

[22] Filed: Dec. 16, 1970

[21] Appl. No.: 98,681

[52] U.S. Cl. ......................274/1 A, 274/7, 274/9 RA

[51] Int. Cl. ............................A63h 3/28, G11b 3/00

[58] Field of Search.................274/1 A, 7, 9 R, 9 RA

[56] References Cited

UNITED STATES PATENTS 3,584,881 6/1971 Goodkind et al. ....................274/9 R

*Primary Examiner*—Leonard Forman
*Assistant Examiner*—Steven L. Stephan
*Attorney*—Steinberg & Blake

[57] ABSTRACT

A toy phonograph comprising a record in which several sound grooves are formed such that their starting points are positioned equidistantly from each other along the outer periphery of the record, a pickup disposed swingably on said record and adapted such that a stylus provided at one end thereof may move radially from the outer periphery of the record toward its center in accordance with rotation of the record, a turntable having a protuberance at the outer peripheral edge thereof, and protrudable and retractable control elements located in the rotary pass of said protuberance in positionally corresponding relation with said respective sound grooves and adapted to contact individually with said protuberance so that when rotation of said turntable having fixedly placed thereon a record is stopped, the selected one of the starting points of said sound grooves will be positioned right below the stylus carried at an end of said pickup.

1 Claim, 14 Drawing Figures

INVENTOR.
KATSUMI WATANABE
BY Steinberg + Blake
Attys

INVENTOR.
BY KATSUMI WATANABE
Steinberg + Blake
attys

INVENTOR.

BY KATSUMI WATANABE

Steinberg & Blake
Attys

INVENTOR
KATSUMI WATANABE

BY Stenberg + Blake
Attys.

TOY PHONOGRAPH

SUMMARY OF THE INVENTION

This invention relates to a toy phonograph which may be used either singly or in combination with other suitable sound-producing or talking toys. The primary object of the invention is to make it possible to record several tunes on a single disc and to optionally select and play any desired one of such tunes.

BRIEF DESCRIPTION OF THE DRAWINGS

The drawings illustrate an embodiment of the present invention, where.

DESCRIPTION OF A PREFERRED EMBODIMENT

Figure 1:
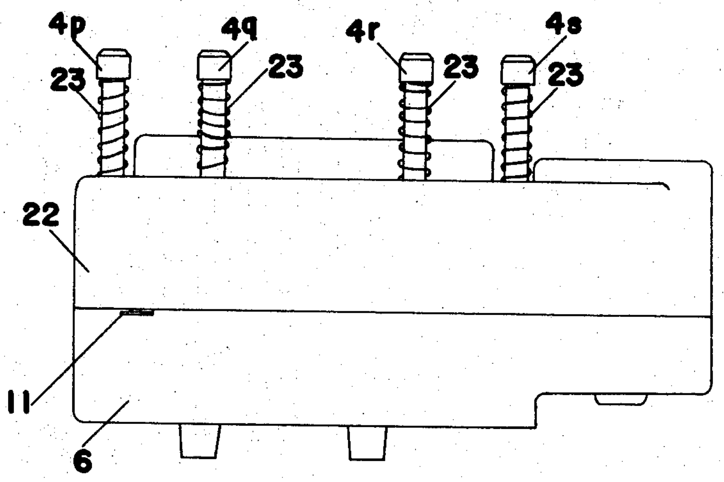
FIG. 1 is a front view thereof.

The invention will be described in more detail hereinbelow with reference to the illustrative drawings embodying the present invention.

As seen in FIGS. 6(P)–6(U), six different tunes are recorded on a disc 1, and the starting ends $P_1$–$U_1$ of the respective tunes are positioned equidistantly from each other around the outer periphery of the disc. At a side of the turntable 5 to which the disc 1 is fixedly attached, there is provided a protuberance 2. 3 is a stylus which moves radially along either of the sound grooves P–U in accordance with rotation of the disc 1. There are also provided control elements 4P–4U which are provided equidistant from each other along the rotatory pass of said protuberance 2 and arranged such that they can be protruded or retracted above or below said pass as so desired. The number of such elements corresponds to the number of tunes recorded on the disc (1).

The operation of these control elements will be discussed with reference to FIG. 6 where the particular control element that is operated is indicated by marking it with oblique lines. The control element 4P in FIG. 6P, which is in operation (that is to say, protruded), hits against the protuberance 2 of the turntable to inhibit rotation of the turntable 5 and hence the disc 1, whereby the starting point $P_1$ of the sound groove p is positioned just below the stylus 3. Likewise, in case the control element 4*q* is projected in the pass, the starting point $q_1$ of the sound groove *q* is positioned right below the stylus (see FIG. 6Q). In the same manner, in the case of control element 4*r* (FIG. 6R), 4s (FIG. 6S), 4*t* (FIG. 6T) or 4*u* (FIG. 6U), the starting point $r_1$, $s_1$, $t_1$ or $u_1$ of the respective sound groove *r*, *s*, *t* or *u* will be positioned below the stylus.

Therefore, it will be understood that all of the control elements remain retracted above the surface level of the pass during the period when the record is being played. After completion of one performance, when it is desired to select and play another tune, for example the tune in *q*, the control element 4*q* is projected in the way of the rotation table protuberance 2 to stop its rotation, allowing the starting point $q_1$ of the sound groove *q* to position just below the stylus, and then said control element 4*q* is retracted to clear the way to allow rotation of the turntable and hence the record, thus starting play of the desired tune.

The disc 1 is set integral with the turntable 5 having the protuberance 2 at its peripheral edge. Said turntable is loosely fitted on a shaft 7 in a box structure 6 and connected to a rotating shaft 10 of a motor 9 through an endless belt 8. The motor 9 is connected through electric contact elements 11 to an outside power source. The stylus 3 is secured at an end of the pickup 12, and the pointed end of said stylus extends through an arcuate slot 14 formed in a chassis 13 and contacts the surface of the disc 1. The other end of said pickup 12 is pivotally secured to a pickup shaft 15 in the chassis 13 and is acted on by which a spring 16 engages a stop 17. Thus, the pickup is always elastically pressed by said spring toward a pickup stop 18 and the free end of said pickup constantly pushes an arm 20 by using a block 19 provided below said pickup as a fulcrum. The pickup 12, therefore, tends to move toward the center of the disc 1 with rotation of the latter and, upon reaching the end of its stroke (that is to say, upon completion of a tune), it functions to separate a movable contact element 21 from one of the electric contact elements 11 to thereby stop operation of the motor 9. The pickup 12 stays at its stopped position at the terminal end of its stroke toward the center. An end portion of each of said control elements 4*p*–4*u*, which are arranged equidistantly from each other along a circumference concentric with the shaft 7 of the box structure 6 and with the disc 1, projects beyond the top surface of the cover box 22 and a compression coil spring 23 is elastically fitted around the projected portion of each said control element as shown. Then elements are guided through the respective control element guiding holes 25*p*–25*u* formed in the chassis 13 so as to push down on a can of a controlling wheel 24 loosely fitted on the shaft 7 and rotate said wheel.

Let us here look into this mechanism more closely. It will be noted that the controlling wheel 24 has integrally provided around its circumferential edge six equidistant projections 24*p*–*24u* which have bevels or inclined cam edges adapted to be contacted with the bottom ends of the respective control elements 4*p* –4*u*. Therefore, if any selected one of said control elements 4*p*–4*u* projected beyond the box-shaped cover structure 22 is pushed down, said control wheel 24 is caused to rotate by engagement between the inclined cam and the particular pushed-down control element. Said controlling wheel 24 is also provided with a further cam element 26 adapted to push up the arm 20. This cam element is arranged to operate while moving within arcuate slot 14 formed in the chassis 13.

It is also to be noted that a part of said controlling wheel 24 is joined to the inside bottom of the body structure 6 by means of a tension coil spring 27, so that said controlling wheel 24 can be returned to its original position engaging a stop (28) coincidentally as said control elements **4*p*–4*u* are released and pushed up by the compression coil spring 23**.

The ends 29 of the bifurcated portions 20' of the Y-shaped arm 20 giving a pressure to the stylus 3 of said pickup 12 are pivotally secured by the respective bearings 30 fixed on the upper face of the chassis 13, and the base portion 20'' where said bifurcated portions meet each other is pivotally supported by said chassis at an end and is also constantly pressed down by a plate spring 31 and an adjusting screw 32. A speaker 33 is fixed centrally of said arm 20.

Figure 2:
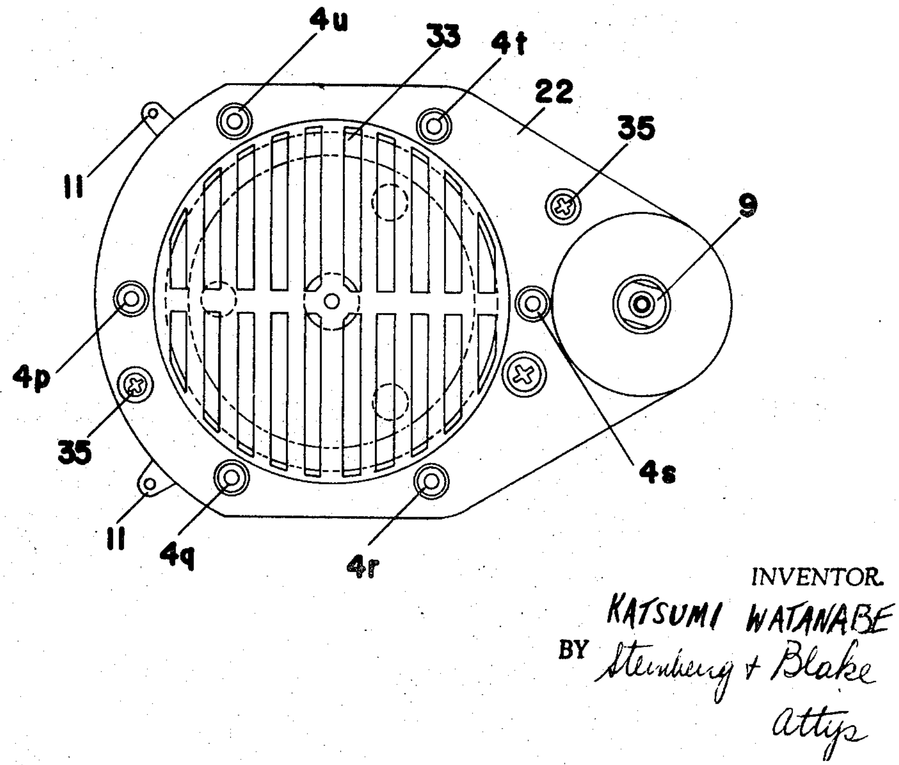
FIG. 2 is a plan view thereof.
Figure 3:
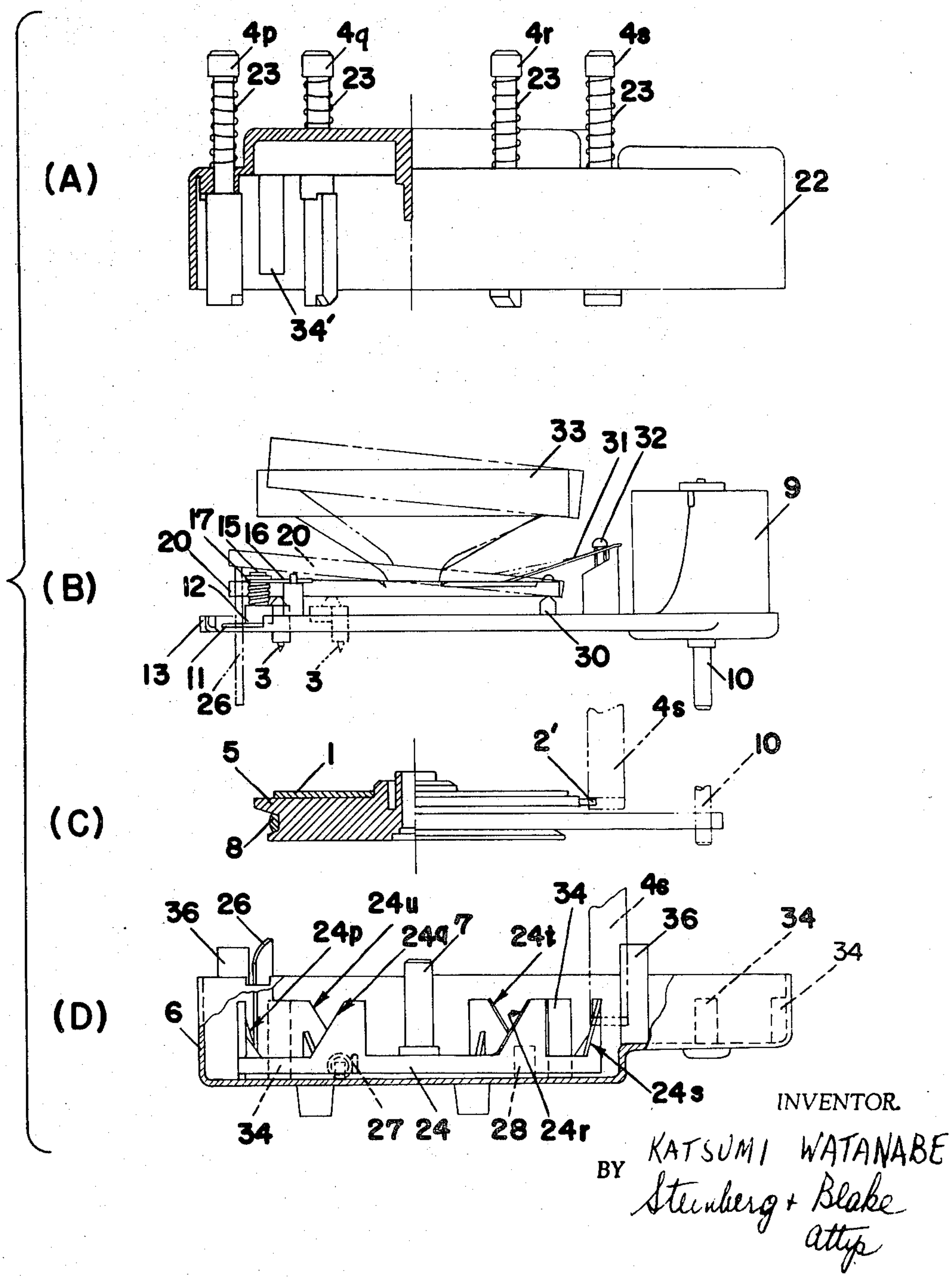
FIG. 3 is an exploded view of the present device divided into several component assemblies for sake of illustration, where A shows the box-shaped cover assembly mounted with control elements, B shows the principal section of the device where a speaker, a motor, a pickup and other primary elements are mounted, C shows the turntable assembly mounted with a record, and D shows the box-shaped body portion having mounted therein a control wheel adapted to operate in correspondence to the control elements.
Figure 4:
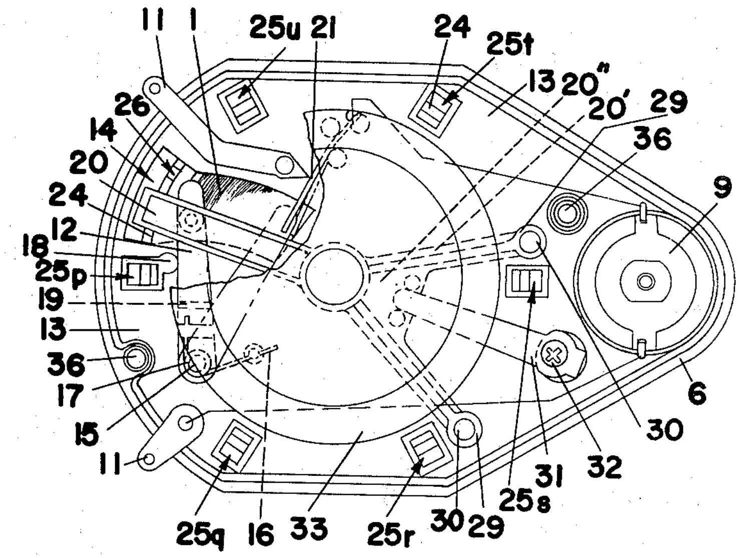
FIG. 4 is a plan view of the device, with the cover portion A being removed.
Figure 5:
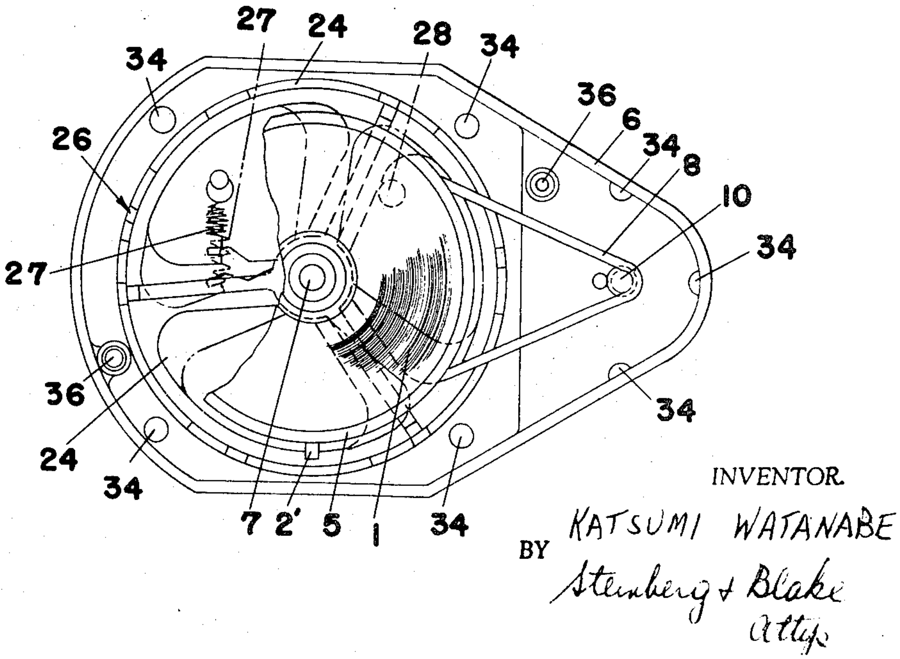
FIG. 5 is a plan view of the device, with both cover portion A and principal section B being removed.

In assembling the above-said construction, the positioning pin 34, 34' are situated at suitable locations in both body 6 and cover 22 so as to maintain suitable spaced relation between the component assemblies, and after completion of the assemblage, screws 35 are engaged with the corresponding threaded upright elements 36 in the body 6 to fasten the assemblage, whereby a generally box-like structure such as shown in FIGS. 1 and 2 is produced.

Now, the use of the present device will be described.

Figure 6P:
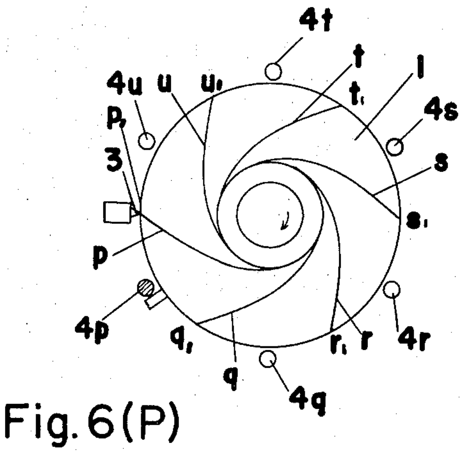
FIGS. 6(P) to 6(U) are the illustrations showing a mechanism for selecting a desired tune on the record.
Figure 6Q:
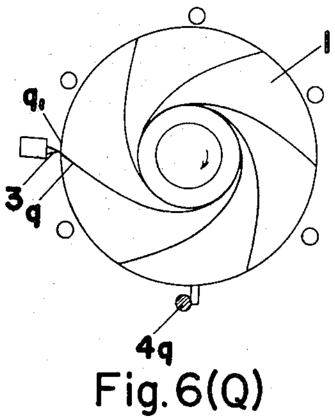
Figure 6R:
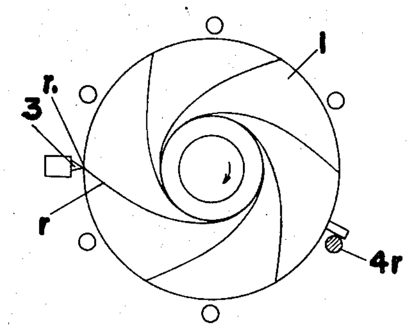
Figure 6S:
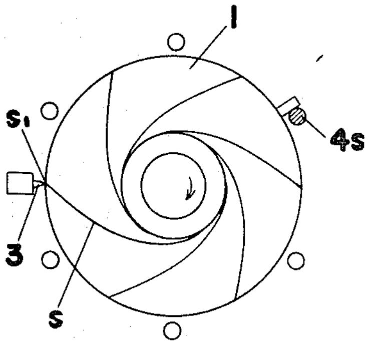
Figure 6T:
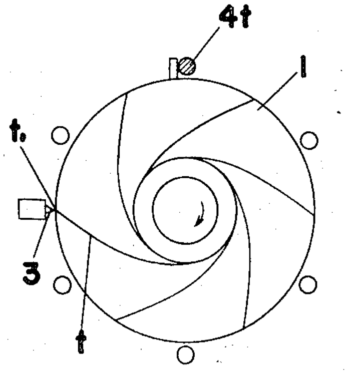
Figure 6U:
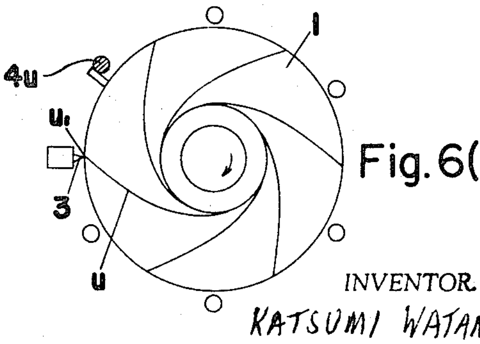

FIrst, the electric contact elements 11 are connected to an electric power source, and then any desired control element, for example 4s, which is projected above the cover structure 22, is pressed down against the force of the compression coil spring 23, whereby the bottom end of said control element descends through the guide hole 25s in the chassis 13 and hits and presses the protruding or cam 24s of the controlling wheel 24. Since said control element 4s is defined in position by the cover box 22 and the guide hole **25*s*, said element 4*s* is urged to slidingly move down along the protruding bevel or inclined cam edge with resulting rotation of the controlling wheel 24 until said element reaches and stops at a predetermined position, the cam element 26 at an end of said controlling wheel 24 forces up the arm 20 against the elastic force of the plate spring 31, so that the end of the pickup 12, where the stylus 3 is carried, is urged to move toward the pickup stop 18 by the elastic force of the spring 16 while being given a rising-up tendency by the same spring 16, with the supporting block 19 acting as a fulcrum, until said stylus-carrying end of said pickup reaches stop 18 and is thereby stopped, thus setting the stylus 3 at a position such as shown in FIG. 6S. In this position, the electric contact element 11 and the movable contact element 21 actuated by the pickup 12 engage with each other so that the motor 9 is energized to rotate the turntable 5 until the radial projection 2 at the periphery of the turntable engages the depressed control element 4*s* to locate the stylus 3** at the starting end $s_1$ of the groove *2*.

Then, when the control element **4*s* is released from the pressing action, the controlling wheel 24 is returned to the position of the stop protuberance 28 by the elastic force of the tension coil spring 27. Consequently, the cam element 26, which has been acting to push up the arm 20, is withdrawn from beneath the arm 20, causing the latter to be pushed downwardly by the elastic force of the plate spring 31, resulting in pressing the pickup 12 to give a suitable stylus pressure to the surface of the disc 1. Also, since the control element 4*s* is pulled upward to give way to the table protuberance 2, the turntable 5 and the disc 1 are allowed to rotate. With rotation of the disc 1, the stylus 3 moves along the sound groove s and the vibrations produced thereby are transmitted to the arm 20 contacting an upper part of the end of the pickup 12 and magnified by the speaker 33, thus giving forth the desired record music. Upon completion of the tune, the pickup 12 separates the movable contact element 21 from the electric contact element 11** to stop the entire operation of the device. When one wants to play another tune soon thereafter, one may operate the corresponding control element in the same manner as described above.

Thus, according to the present invention, a protuberance is provided adjacent to the outer periphery of a record in which several streaks of sound grooves are formed such that their starting points are positioned equidistantly from each other along the circumferential brim of the record, and the control elements corresponding to said respective sound grooves are provided protrudably and retractably in the rotatory passage of said protuberance such that, in operation, any selected one of said control elements is projected within the passage of said protuberance to check the latter so as to accordingly stop rotation of the record, thereby positioning the starting point of the particular sound groove in exact register with the stylus. It is thus possible to select and play any desired one of the several tunes recorded on a single disc, and also such tune selection can be achieved by a simple finger work to let a particular control element project into and retract from the rotatory passage of said protuberance, so that even a child can playfully operate it with ease. Further, the device is composed of only mechanical arrangements for the protuberance and the control elements for stopping it and requires no other electrical control means, so that the device is extremely simple in structure and can be manufactured at low cost. Thus, the present device is a most joyful and exciting toy for children.

I claim:

1. In a toy phonograph, a chassis and a housing in which said chassis is located, a rotary turntable situated in said housing on said chassis and supported by said chassis for rotary movement about a central axis extending perpendicularly through said turntable at the center thereof, said turntable fixedly carrying at its outer periphery a protuberance which extends outwardly beyond said turntable and which rotates therewith, an electric motor carried by said chassis and operatively connected to said turntable for rotating the latter when said motor is energized, a record carried by said turntable for rotation therewith and including a plurality of sound grooves each progressing from the periphery to the center of said record and respectively having starting points equidistantly arranged with respect to each other along the outer periphery of the record, a pickup and a stylus carried thereby, said chassis supporting said pickup for swinging movement toward and away from the record as well as for swinging movement about an axis parallel to the central axis of said turntable so that the stylus can follow a selected sound groove, a spring operatively connected to said pickup for urging said stylus to the outer periphery of the record, a plurality of control elements distributed circumferentially around said turntable and guided by said chassis and housing for axial movement respectively along a plurality of axes which are parallel to each other and parallel to the central axis of said turntable, said control elements each extending upwardly beyond said housing so that a selected control element can be depressed by the operator to an elevation where it will be situated in the path of movement of said protuberance at the periphery of said turntable, each control element when engaging said protuberance situating the starting end of a selected sound groove in a position to be engage by the stylus, a plurality of springs operatively connected to said control elements for urging the latter to rest positions respectively situated above the path of movement of said protuberance, an arm in said housing extending across and over said pickup and a spring urging said arm to press downwardly against said pickup to hold the stylus carried thereby in a sound groove, a pair of electrical contacts engaging each other to maintain said motor energized, at least one of said contacts normally engaging the other and being situated in the path of movement of said pickup to be displaced thereby away from said other contact to stop the operation of the motor when the stylus reaches the end of a selected sound groove, and a control wheel supported for free rotation by said chassis coaxially with said turntable about said central axis with said control wheel being turnable independently of said turntable, a spring being operatively connected to said control wheel for normally maintaining the latter at a position where it does not influence the playing of s selected sound groove, and said control wheel having a plurality of inclined cam edges respectively situated in the paths of movement of said control elements so that when a selected control element is depressed said control wheel will be turned in a given direction through a given distance while the selected control element is situated in the path of movement of said protuberance, said control wheel carrying a cam which when said control wheel is turned by a selected control element engages and raises said arm away from said pickup so that the latter can automatically return to a starting position while said one contact engages the other contact to energize said motor and start the rotation of said turntable, the latter rotating until said protuberance engages the depressed selected control element, so as to situate the stylus at the starting end of a selected sound groove, whereupon when the operator releases the selected control element the latter automatically returns to its position beyond the path of movement of said protuberance and said control wheel returns to its position where it has no influence on the playing of a record while said cam which displaced said arm away from said pickup is moved with said control wheel to a position releasing said arm for movement against said pickup to place the stylus in engagement with the selected sound groove.

* * * * *